United States Patent
Shiba et al.

(10) Patent No.: US 8,116,249 B2
(45) Date of Patent: Feb. 14, 2012

(54) WIRELESS COMMUNICATION SYSTEM AND WIRELESS COMMUNICATION DEVICE

(75) Inventors: Youichirou Shiba, Fuchu (JP);
Kiyotaka Matsue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 808 days.

(21) Appl. No.: 12/190,951

(22) Filed: Aug. 13, 2008

(65) Prior Publication Data

US 2009/0046618 A1 Feb. 19, 2009

(30) Foreign Application Priority Data

Aug. 13, 2007 (JP) ................................. 2007-210886

(51) Int. Cl.
*H04H 20/71* (2008.01)

(52) U.S. Cl. ........ 370/312; 370/328; 370/432; 370/349; 370/338; 714/748; 714/749

(58) Field of Classification Search .................. 370/312, 370/328; 714/748, 749
See application file for complete search history.

(56) References Cited

U.S. PATENT DOCUMENTS

| | | | |
|---|---|---|---|
| 2006/0083233 A1* | 4/2006 | Nishibayashi et al. | 370/389 |
| 2006/0268886 A1* | 11/2006 | Sammour et al. | 370/394 |
| 2007/0189207 A1* | 8/2007 | Sammour et al. | 370/328 |
| 2007/0230373 A1* | 10/2007 | Li et al. | 370/267 |
| 2007/0258466 A1* | 11/2007 | Kakani | 370/395.53 |
| 2009/0247089 A1* | 10/2009 | Budde et al. | 455/69 |
| 2010/0153807 A1* | 6/2010 | Kakani | 714/749 |

OTHER PUBLICATIONS

IEEE standard 802.11, 1999 Edition (cover page).
IEEE standard 802.11e, 2005.

* cited by examiner

*Primary Examiner* — Ricky Ngo
*Assistant Examiner* — Rasheed Gidado
(74) *Attorney, Agent, or Firm* — Turocy & Watson, LLP (57) ABSTRACT

An access point transmits data frames to a plurality of wireless terminals by MC or BC communication. When the data frames are transmitted, data to identify the presence of the return of an ACK frame as affirmative acknowledgment with respect to transmitted contents is applied to an MAC header. In a case where a Block ACK frame is requested as affirmative acknowledgment with respect to the transmission of a plurality of frames in the MC or BC communication, the plurality of wireless terminals return the Block ACK frame to the access point and the wireless terminals other than the wireless terminal itself by the MC or BC communication.

6 Claims, 11 Drawing Sheets

WIRELESS COMMUNICATION SYSTEM AND WIRELESS COMMUNICATION DEVICE

CROSS-REFERENCE TO RELATED APPLICATIONS

This application is based upon and claims the benefit of priority from prior Japanese Patent Application No. 2007-210886, filed Aug. 13, 2007, the entire contents of which are incorporated herein by reference.

BACKGROUND OF THE INVENTION

1. Field of the Invention

The present invention relates to a wireless communication system and a wireless communication device. More particularly, it relates to a wireless communication system in which data communication is performed by a broadcast system and a multicast system under a wireless communication LAN environment, and a wireless communication device for use in the system.

2. Description of the Related Art

Wireless LAN communication is communication which is performed in accordance with a frame format and a protocol for communication control defined by the standard of IEEE802.11 stipulated by the Institute of Electrical and Electronics Engineers (hereinafter referred to as IEEE) (e.g., see IEEE standard 802.11, 1999 Edition, IEEE standard 802.11e, 2005).

As a data communication method in a medium access control (MAC) layer according to the standard of this wireless LAN communication, three types of methods are defined. That is, they are a unicast (UC) system in which data is transmitted to one specific wireless terminal, a broadcast (BC) system in which data is transmitted to all wireless terminals, and a multicast (MC) system in which data is transmitted to one or more specific wireless terminals. Among these systems, in the UC system, there is introduced a mechanism in which acknowledgment (hereinafter referred to as the ACK) is performed with respect to the data transmission. However, in the BC system or the MC system, there are not introduced a mechanism in which the acknowledgment is performed with respect to the data transmission and a mechanism of block acknowledgment (Block ACK) (hereinafter referred to as the BA) with respect to a plurality of frames.

An ACK return method to be performed by the UC system, which has heretofore been used, will hereinafter be described. On receiving a data frame, a receiver returns the ACK to a sender after a short interframe space (hereinafter referred to as the SIFS) of a data transmission interval in the wireless LAN. Here, the SIFS is set to 16 μs in the standard of IEEE802.11a, and is set to 10 μs in the standard of IEEE802.11b. Thus, the standard is determined with regard to the ACK return in the UC system. However, in the BC or MC system, the standard of the ACK return during the data transmission is not determined, and the ACK does not have to be returned.

However, the return of the ACK becomes important in a certain case, depending on the contents of the transmission data. For example, in the case of the distribution of stock price information, when stock prices have to be securely notified to all the receivers simultaneously without inequality, the data transmission and the return of the ACK by the BC or MC system are essential.

Therefore, when the ACK return method used in the UC communication is used as it is as the acknowledgment with respect to the data frame transmitted by the BC or MC system, the following problem occurs. That is, the ACK is simultaneously returned from all the receivers to the sender, and hence the frames transmitted from the plurality of receivers collide with one another and the information collapses. As a result, the sender cannot identify the receiver which has transmitted the frame. That is, the ACK return method for use in the UC communication cannot be used in the BC or MC system without being contrived.

As described above, in the frame transmission method of the BC or MC system by a protocol sequence using control and management frames defined in the standards of IEEE802.11 and IEEE802.11e, there is not present a mechanism in which the sender recognizes that the receiver has received the frame, and hence the ACK cannot be returned. Therefore, the following problems occur.

(a) Even when frame loss is generated and a receiver side cannot receive any frame, a sender side cannot recognize this fact, and processing of resending the frame cannot be performed.

(b) If the mechanism of the acknowledgment in the UC communication is simply applied to the acknowledgment of the BC or MC communication, acknowledgment frames collide with one another under a wireless LAN communication environment, and hence the acknowledgment frame cannot normally be received on the sender side.

It is to be noted that in the standard of IEEE802.11e, the format of the acknowledgment frame with respect to a plurality of frames is defined.

BRIEF SUMMARY OF THE INVENTION

According to a first aspect of the present invention, there is provided a wireless communication system which performs wireless communication between one access point and a plurality of wireless terminals, wherein the access point is configured to transmit a plurality of data frames to the plurality of wireless terminals by one communication of multicast communication and broadcast communication, and configured to request Block ACK frames as affirmative acknowledgment, and each of the plurality of wireless terminals is configured to generate the Block ACK frame and configured to return the Block ACK frame to the access point and the wireless terminals other than the wireless terminal itself by one communication of the multicast communication and the broadcast communication, in a case where the access point requests the Block ACK frame.

According to a second aspect of the present invention, there is provided an access point for use in a wireless communication system which performs wireless communication between the one access point and a plurality of wireless terminals, the access point being configured to transmit a plurality of data frames to the plurality of wireless terminals by one communication of multicast communication and broadcast communication, configured to store, in an MAC header, data which designates the return time and order of a Block ACK frame as affirmative acknowledgment, configured to check data stored in a Reserved region of BA Control field in the Block ACK frame at a time when the Block ACK frames returned from the plurality of wireless terminals are received, and configured to detect that MAC address of one of the wireless terminals is stored in a Block ACK Bitmap of the Block ACK frame in a case where the data stored in the Reserved region is 1.

According to a third aspect of the present invention, there is provided wireless terminals for use in a wireless communication system which performs wireless communication between one access point and the plurality of wireless terminals, each of the wireless terminals being configured to receive a data frame transmitted from the access point, configured to judge whether or not the received data frame has been transmitted by one communication of multicast communication and broadcast communication, configured to further judge whether or not the return of a Block ACK frame as affirmative acknowledgment with respect to received contents is necessary, in a case where it is judged that the data frame has been transmitted by one communication of the multicast communication and the broadcast communication, configured to generate the Block ACK frame in a case where it is judged that the return of the Block ACK frame is necessary, and configured to return the Block ACK frame to the access point and the wireless terminals other than the wireless terminal itself by one communication of the multicast communication and the broadcast communication.

DETAILED DESCRIPTION OF THE INVENTION

Figure 1:
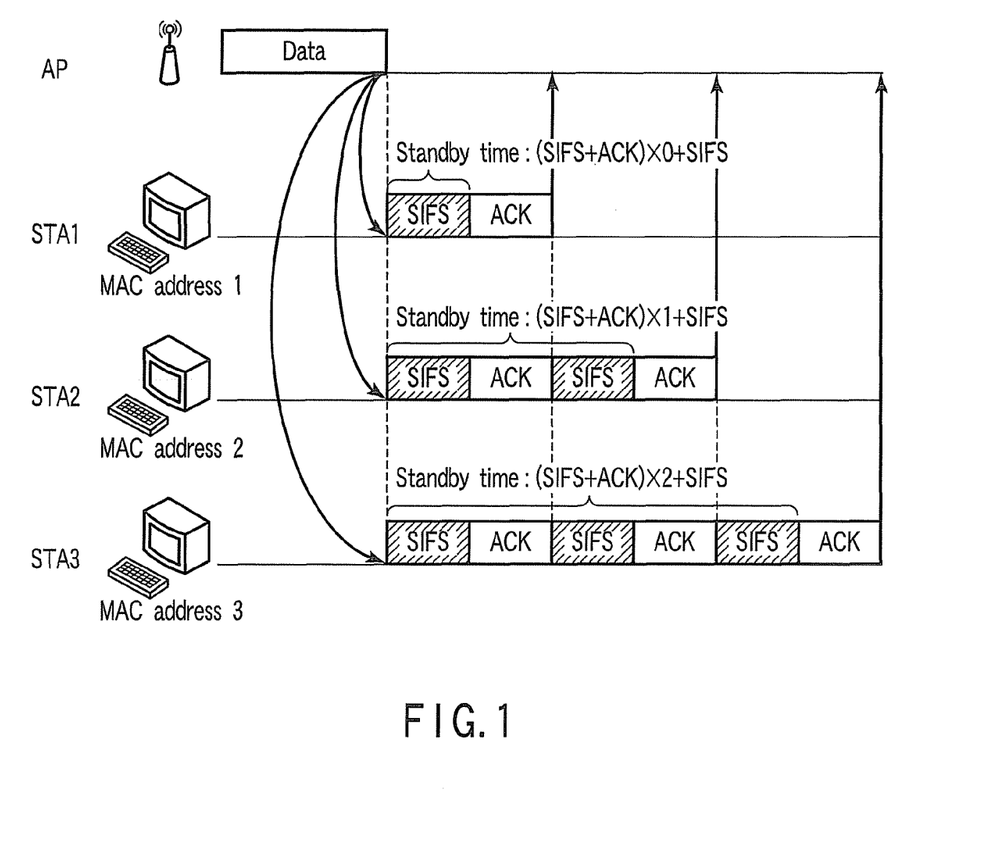
FIG. 1 is a diagram showing an ACK return method in a wireless communication system according to a reference example.

First, a reference example will be described prior to the description of an embodiment of the present invention. FIG. 1 shows an ACK return method in a wireless communication system according to the reference example. The present example shows a case where one access point AP as a key station and three wireless terminals STA1 to STA3 as mobile units are present in one basic service set (BBS).

In the present circumstances, under a wireless LAN communication environment, a theme is that ACK be well returned with respect to a data frame transmitted using MC or BC communication. To avoid the collision of ACK frames returned from a plurality of wireless terminals, a method is considered in which the order of ACK to be returned before starting communication is determined so that timings to return ACK frames from the wireless terminals do not overlap with one another. In an ACK return method according to the present reference example, in a case where the MC or BC communication is performed, the data frame which requires the ACK return is prepared. Then, on an access point side, the timing to return the ACK is adjusted before the transmission of the data frame, whereby the collision of the ACK returned from the plurality of wireless terminals is avoided, and the access point can identify the wireless terminal which has transmitted the ACK.

Specifically, in FIG. 1, when the access point AP transmits the data frame, after the elapse of minimum standby time (SIFS), the wireless terminal STA1 returns the ACK frame by the UC communication. Subsequently, after the elapse of standby time (SIFS+ACK)×1+SIFS, the wireless terminal STA2 returns the ACK frame by the UC communication. After the elapse of further standby time (SIFS+ACK)×2+SIFS, the wireless terminal STA3 returns the ACK frame by the UC communication. Thus, the ACK frames are successively returned from the three wireless terminals STA1 to STA3 to the access point AP with time lag by the UC communication.

As a method other than the above method, a method of specifying a wireless terminal which can interpret a data frame requiring the return of the ACK or a method of changing standby time till the return of the ACK is also considered. However, even if the collision of the ACK frames can be avoided as described above, the ACK is returned from the wireless terminal every time the access point transmits the data frame, so that a data communication speed lowers. Therefore, it is demanded that a communication protocol be further contrived.

Next, various embodiments of the present invention will be described. It is to be noted that in this description, parts common to all the drawings are denoted with the same reference numerals so that redundant description is avoided.

First Embodiment

Figure 2:
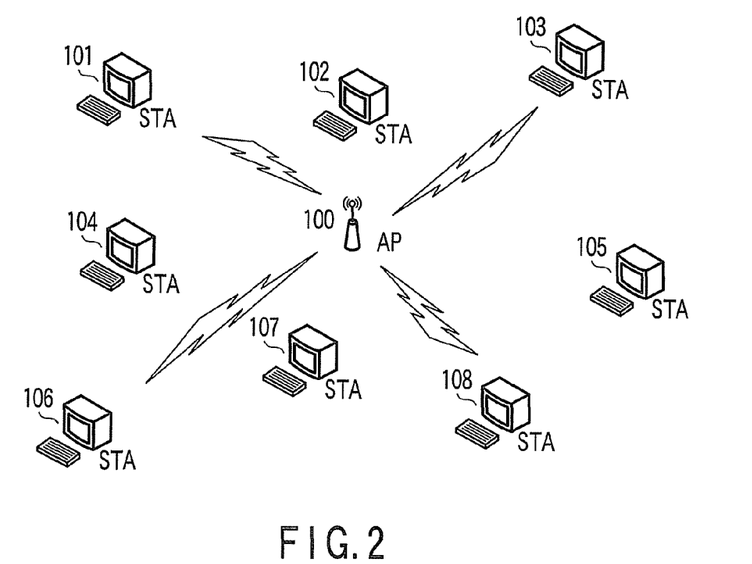
FIG. 2 is a constitution diagram showing one example of a wireless LAN communication system using a wireless communication device according to a first embodiment.

FIG. 2 shows one example of a wireless LAN communication system according to a first embodiment of the present invention. The wireless LAN communication system shown in FIG. 2 illustrates a case where an access point (AP) 100 as a key station, and a plurality of mobile units, that is, eight wireless terminals (STA) 101 to 108 in the present example are present in one BBS. The access point 100 has functions of performing MC communication to simultaneously transmit data to a large number of specified wireless terminals, and performing BC communication to simultaneously transmit data to a large number of unspecified wireless terminals in conformity to the standard of IEEE802.11 or IEEE802.11e of wireless LAN communication. Each of the wireless terminals 101 to 108 has functions of performing MC communication to simultaneously transmit data to the access point 100 and a large number of specified wireless terminals other than the wireless terminal itself, and performing BC communication to simultaneously transmit data to the access point 100 and a large number of unspecified wireless terminals other than the wireless terminal itself in conformity to the standard of IEEE802.11 or IEEE802.11e of the wireless LAN communication.

Figure 3:
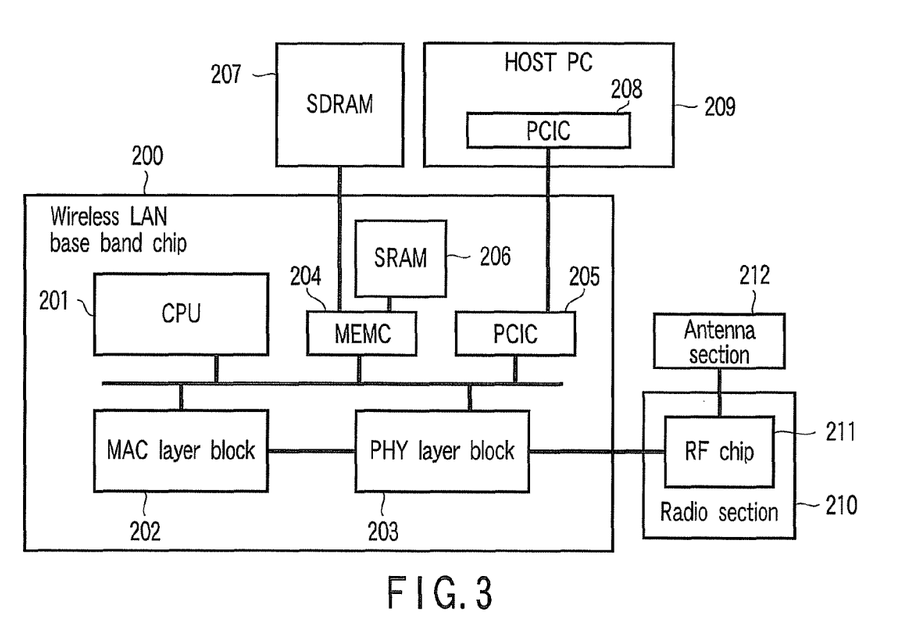
FIG. 3 is a block diagram showing one example of the hardware of an access point and wireless terminals shown in FIG. 1.

FIG. 3 is a block diagram showing the hardware constitutions of the access point 100 and the wireless terminals 101 to 108 in FIG. 2. In FIG. 3, reference numeral 200 is a wireless LAN base band chip; 201 is a central processing unit (CPU); 202 is a medium access controller (MAC) layer block; 203 is a physical (PHY) layer block; 204 is a memory controller (MEMC); 205 is a peripheral components interconnect controller (PCIC); 206 is a static random access memory (SRAM); 207 is a synchronous dynamic random access memory (SDRAM); 208 is a peripheral components interconnect controller (PCIC); 209 is a host personal computer (HOST PC); 210 is a wireless section (RF section); 211 is an RF chip; and 212 is an antenna section.

Here, the basic operation of the hardware shown in FIG. 3 will be described. Data transmitted from the HOST PC 209 is stored in a memory (the SRAM 206 or the SDRAM 207) via the host-side PCIC 208 and the PCIC 205 of the wireless LAN base band chip 200. The SRAM 206 and the SDRAM 207 are accessed via the MEMC 204. The data stored in the memory is processed by the CPU 201. Afterward, the data is output to the wireless section 210 via the MAC layer block 202 and the PHY layer block 203, transferred from the RF chip 211 to the antenna section 212, and finally transmitted as a wireless LAN frame. Data reception is processed in a flow reverse to that of the data transmission.

It is to be noted that the processing of contents described in the present embodiment can be performed by either software or hardware. When the processing is performed by the hardware, the contents are processed by the MAC layer block 202. When the processing is performed by the software, the contents are processed by the CPU 201.

Figure 4:
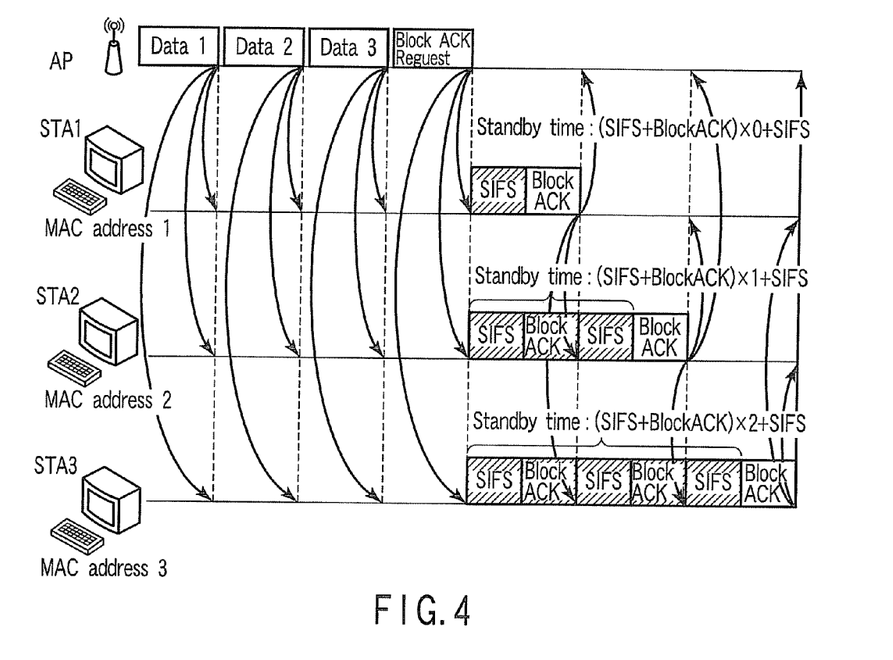
FIG. 4 is a diagram showing a behavior in a case where when one access point and three wireless terminals are present in one BSS in the wireless LAN communication system shown in FIG. 2, a data frame is transmitted and an ACK frame is returned between the access point and three wireless terminals.

To simplify explanation, FIG. 4 illustrates a case where one access point AP and three wireless terminals STA1, STA2 and STA3 are present in one BSS in the wireless LAN communication system shown in FIG. 2. Then, data frames are simultaneously transmitted from the access point AP to the three wireless terminals STA1, STA2 and STA3 by use of MC or BC communication, and the three wireless terminals STA1, STA2 and STA3 receive the data frames. Afterward, the three wireless terminals STA1, STA2 and STA3 return ACK frames (Block ACK frames) as affirmative acknowledgment with respect to the received contents to the access point AP and the wireless terminals other than the wireless terminals themselves in a pre-designated order by use of the MC or BC communication. This behavior is shown in the drawing. In this case, the order in which the three wireless terminals STA1, STA2 and STA3 return the ACK frames is the order of the wireless terminals STA1, STA2 and STA3 in the same manner as in FIG. 1. However, the frames do not necessarily have to be returned in this order.

FIGS. 5A to 5D show, with an elapse of time, a behavior in a case where, as shown in FIG. 4, the data frames are transmitted from the access point AP to the wireless terminals STA1, STA2 and STA3 by use of the MC or BC communication, and the ACK frames are returned from the wireless terminals STA1, STA2 and STA3 by use of the MC or BC communication. It is to be noted that 00:00:39:00:18:01, 00:00:39:00:18:02 and 00:00:39:00:18:03 shown in FIGS. 5A to 5D indicate MAC addresses applied to the wireless terminals STA1, STA2 and STA3 in advance.

Figure 5A:
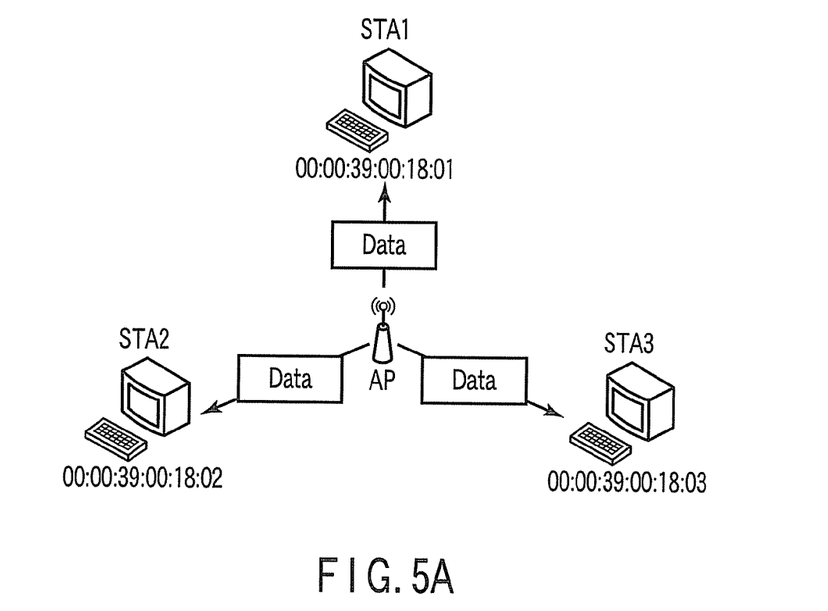
FIGS. 5A to 5D are diagrams showing, with an elapse of time, a behavior in a case where the data frame is transmitted and the ACK frame is returned between the access point and three wireless terminals in FIG. 4.
Figure 5B:
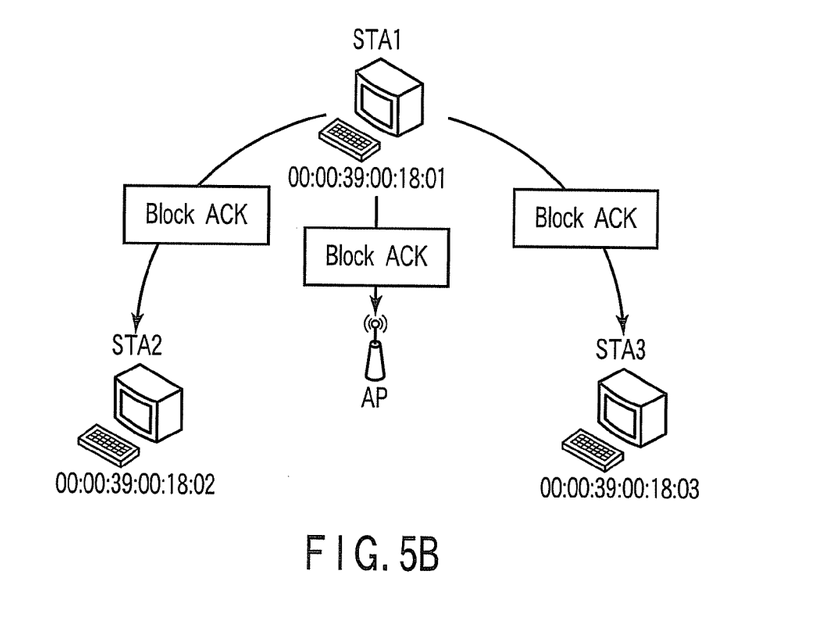
Figure 5C:
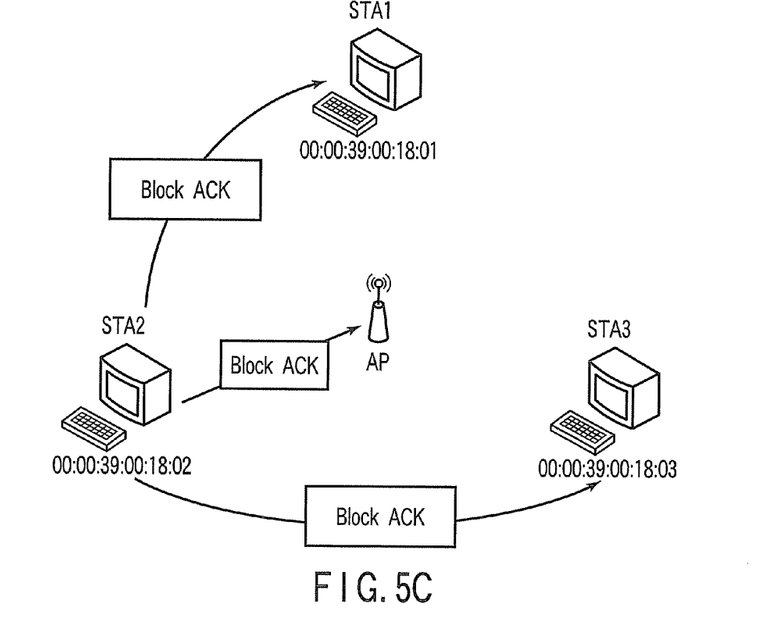
Figure 5D:
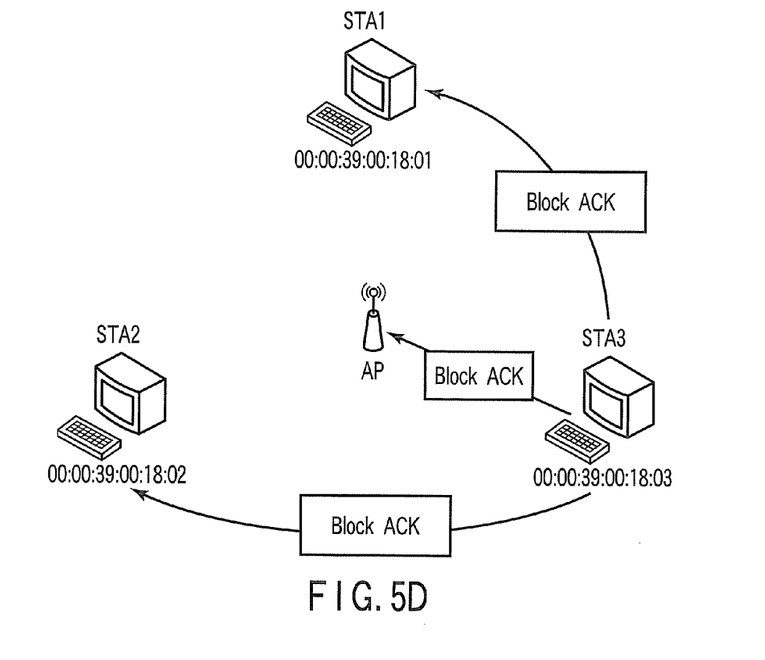

As shown in FIG. 5A, the access point AP simultaneously transmits the data frames to the wireless terminals STA1, STA2 and STA3 by use of the MC or BC communication. In this case, between the access point AP and the three wireless terminals STA1, STA2 and STA3, a control protocol for establishing the communication has already been operated, and an environment where the communication can be performed can be obtained (a state in which the communication can be performed as defined by the standard of IEEE802.11 (state 3)). After the wireless terminals STA1, STA2 and STA3 receive the data frames, first, as shown in FIG. 5B, the ACK frame (the Block ACK frame) generated by the wireless terminal STA1 is returned using the MC or BC communication. Subsequently, as shown in FIG. 5C, the ACK frame (the Block ACK frame) generated by the wireless terminal STA2 is returned using the MC or BC communication. Then, as shown in FIG. 5D, the ACK frame (the Block ACK frame) generated by the wireless terminal STA3 is returned using the MC or BC communication. In addition to the function of generating the Block ACK frame, each wireless terminal has a function of comparing the Block ACK frame generated by the wireless terminal itself with the Block ACK frame transmitted from the other wireless terminal to correct the Block ACK frame beforehand generated according to the comparison result in a case where the Block ACK frame transmitted from the other wireless terminal is beforehand received.

Figure 6:
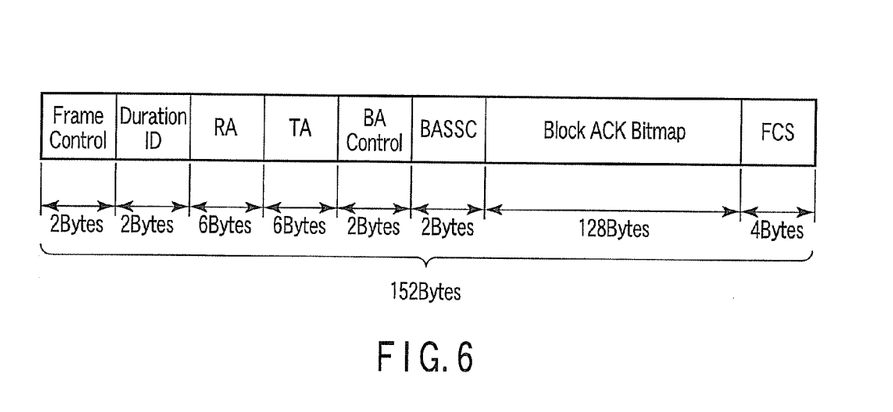
FIG. 6 is a diagram showing the format of Block ACK frame defined in the standard of IEEE802.11e.

FIG. 6 shows the format of the Block ACK frame defined in the standard of IEEE802.11e. It is to be noted that this format is well known, and hence the description of the meanings of all fields is omitted. However, only the meanings of a BA Control field and a Block ACK Bitmap field especially related to the present invention will hereinafter be described. The BA Control field is data of two bytes, and data concerned with affirmative acknowledgment (ACK) is stored in the field. According to the original standard of IEEE802.11e, in the Block ACK Bitmap field, data indicating whether or not the data frame transmitted from the access point AP has normally been received is stored. In this case, the number of the data frames transmitted from the access point AP is 64, and the data of two bytes is assigned to each frame. Specifically, when the data frame is normally received, data 1 (01) is stored in the region of the corresponding frame. When the data frame is not normally received, data 0 (00) is stored in the region of the corresponding frame.

Figure 7:
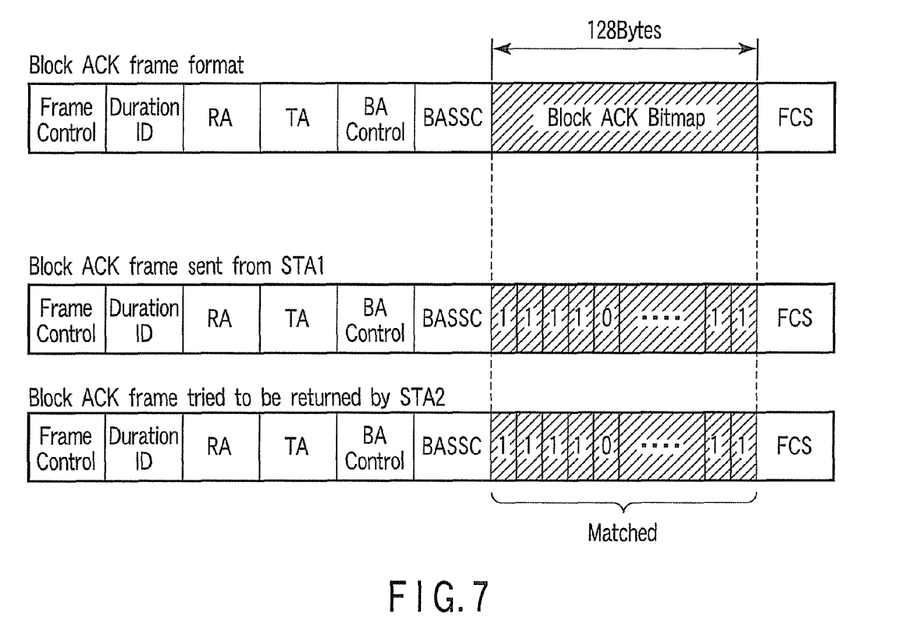
FIG. 7 is a diagram showing a behavior in a case where in a wireless terminal STA2 which has received Block ACK sent from a wireless terminal STA1 in FIG. 5B, the Block ACK Bitmap field of the sent Block ACK frame is compared with the Block ACK Bitmap field of the Block ACK frame to be returned from the wireless terminal STA2, and both the fields match with each other.

FIG. 7 shows a behavior in a case where in FIG. 5B, the Block ACK Bitmap field of the Block ACK frame returned from the wireless terminal STA1 and received by the wireless terminal STA2 matches with the Block ACK Bitmap field of the Block ACK frame which has been generated by the wireless terminal STA2 and which is to be returned.

Figure 8:
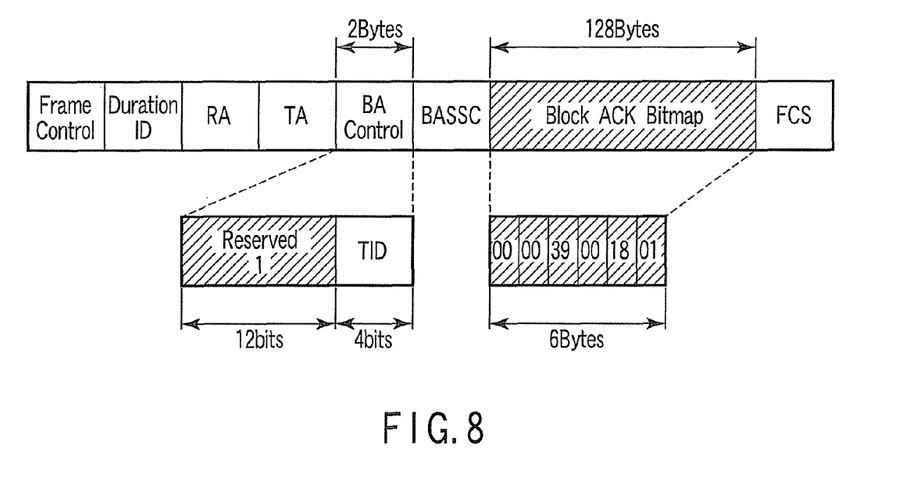
FIG. 8 is a diagram showing a behavior in a case where when the Block ACK Bitmap fields match with each other as a comparison result, the Block ACK frame is corrected in the wireless terminal STA2.

In a case where the Block ACK Bitmap fields match with each other as a comparison result in the wireless terminal STA2 which has received the Block ACK frame returned from the wireless terminal STA1, as shown in FIG. 8, 1 is stored in a Reserved region of a BA Control field. Moreover, the byte length of the Block ACK Bitmap field originally having 128 bytes is reduced to 6 bytes, and the MAC address (00:00:39: 00:18:01) beforehand applied to the wireless terminal STA1 in which the Block ACK Bitmap fields match with each other as the comparison result is stored in the Block ACK Bitmap field having the reduced length of 6 bytes. Afterward, as shown in FIG. 5C, the Block ACK frame corrected in this manner is returned from the wireless terminal STA2 to the access point AP and the wireless terminals other than the wireless terminal STA2 itself by use of the MC or BC communication.

Figure 9:
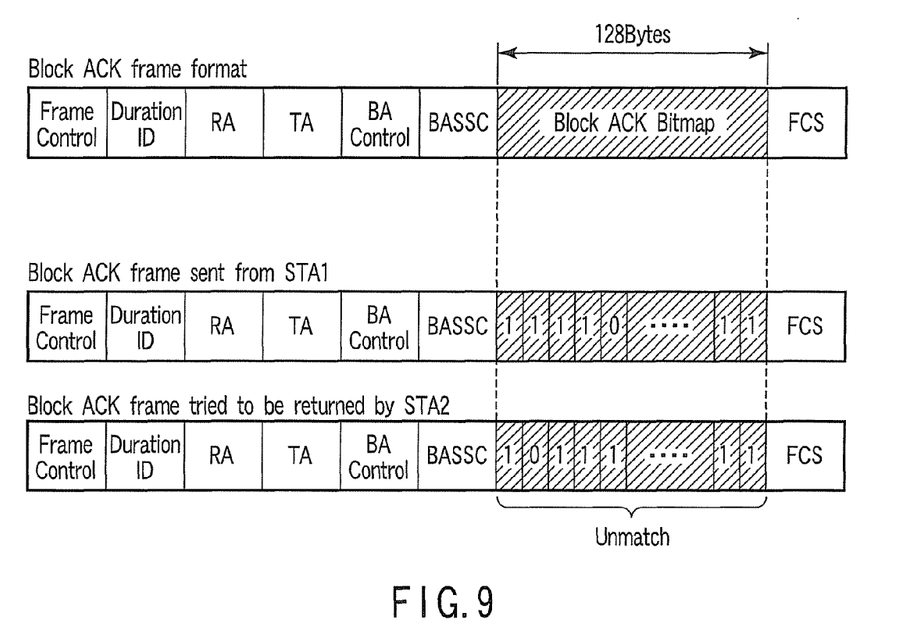
FIG. 9 is a diagram showing a behavior in a case where in the wireless terminal STA2 which has received the Block ACK sent from the wireless terminal STA1 in FIG. 5B, the Block ACK Bitmap field of the sent Block ACK frame is compared with the Block ACK Bitmap field of the Block ACK frame to be returned from the wireless terminal STA2, and both the fields do not match with each other.

FIG. 9 shows a behavior in a case where in FIG. 5B, the Block ACK Bitmap field of the Block ACK frame returned from the wireless terminal STA1 and received by the wireless terminal STA2 does not match with the Block ACK Bitmap field of the Block ACK frame which has been generated by the wireless terminal STA2 and which is to be returned.

Figure 10:
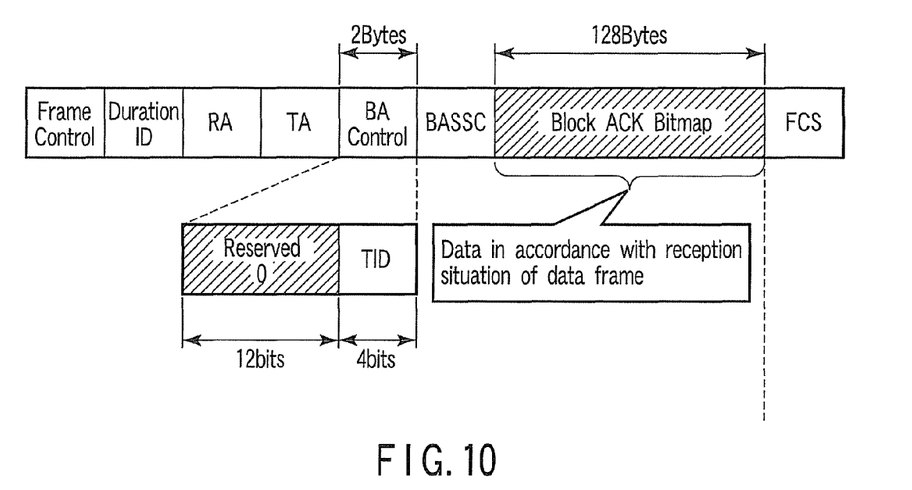
FIG. 10 is a diagram showing a behavior in a case where when the Block ACK Bitmap fields do not match with each other as a comparison result, the Block ACK frame is corrected in the wireless terminal STA2.

In this case, as shown in FIG. 10, 0 is stored in a Reserved region of a BA Control field of the Block ACK frame generated by the wireless terminal STA2, and in the Block ACK Bitmap field, the beforehand generated data in accordance with the reception situation of the data frame by the wireless terminal itself is stored as it is without being corrected. Afterward, as shown in FIG. 5C, the Block ACK frame is returned from the wireless terminal STA2 to the access point AP and the wireless terminals other than the wireless terminal STA2 itself by use of the MC or BC communication.

Here, the access point AP shown in FIG. 2 has the following functions.

(a) In a case where the data frame is transmitted by the MC or BC communication, data which designates the time and order of the return of the Block ACK frame as the affirmative acknowledgment with respect to the transmission frame is applied to an MAC header.

(b) When the Block ACK frame is received from the wireless terminal STA, first the Reserved region in the BA Control field of the frame is checked. When this region is 1, it is judged that the MAC address is stored in the Block ACK Bitmap field. Then, it is detected whether or not the MAC address matches with a transmitter MAC address of one of the Block ACK frames received and recorded by the access point. Afterward, the frame which matches with the transmitter MAC address of the Block ACK frame held in the access point is searched. When the frame is detected, the Block ACK Bitmap field of the frame is inspected. Then, the data frame which has been transmitted from the access point and the wireless terminal STA which can receive the data frame are detected.

On the other hand, in a case where the Block ACK frame returned from the wireless terminal STA is received and the Reserved region of the BA Control field in the Block ACK frame is 0 as a check result, it is detected that the original standard data corresponding to the reception result of the wireless terminal STA is stored in the Block ACK Bitmap field.

The access point AP has such functions, and can hence detect the wireless terminal which can receive the data of the frame, and the frame. Conversely, the frame from which the data cannot be received can be detected. The access point AP can transmit the data frame again according to this detection result.

On the other hand, the wireless terminal STA shown in FIG. 2 has the following functions.

(a) In a case where the data frame transmitted from the access point AP is received, it is judged whether or not the data frame is a data frame transmitted from the access point AP by the MC or BC communication.

(b) In a case where as the result of the above judgment, it is judged that the data frame has been transmitted from the access point AP by the MC or BC communication and it is detected that the return of the Block ACK as the affirmative acknowledgment with respect to the received contents is necessary, predetermined data (e.g., 10, 1101) indicating this effect is recorded in the firmware of the CPU 201 in FIG. 3. Then, as shown in FIGS. 4 and 5, the Block ACK frame is generated, and returned to the access point AP and the wireless terminals STA other than the wireless terminal itself by the MC or BC communication while observing the predetermined interval and order.

(c) In a case where the Block ACK frame returned from the other wireless terminal STA is beforehand received, the Block ACK Bitmap field of this Block ACK frame is compared with the Block ACK Bitmap field of the Block ACK frame which has been generated by the wireless terminal itself and which is to be returned to the access point AP and the wireless terminals STA other than the wireless terminal itself.

(d) In a case where as shown in FIG. 7, the fields completely match with each other as the result of the above comparison, as shown in FIG. 8, this effect is recorded in the Reserved region (1 is stored in the Reserved region) of the BA Control field in the Block ACK frame, and the Block ACK Bitmap field of the Block ACK frame is reduced from 128 bytes as the original standard to 6 bytes. In the field, the MAC address of the other wireless terminal STA having the matched Block ACK Bitmap field is stored.

In this case, afterward, the Block ACK Bitmap field of the Block ACK frame to be returned by the wireless terminal STA does not have the original meaning that the reception situation of the data frame in the wireless terminal itself is indicated. This Block ACK Bitmap field indicates the data (an MAC address) of the wireless terminal which has returned the matched Block ACK Bitmap field. The receiver of the Block ACK frame needs to be notified that the meaning of the Block ACK Bitmap field has changed, so that 1 is stored in the Reserved region of the BA Control field as shown in FIG. 8.

(e) When the comparison result of the Block ACK Bitmap fields indicates mismatch as shown in FIG. 9, as shown in FIG. 10, this effect is recorded in the Reserved region (0 is stored in the Reserved region) of the BA Control field in the Block ACK frame, and data in accordance with the reception situation is stored with respect to the Block ACK Bitmap field which has been generated by the wireless terminal itself and which is to be returned according to the original standard.

(f) When the above processing is completed, the Block ACK frame is returned to the access point AP and the wireless terminals STA other than the wireless terminal itself by the MC or BC communication of Immediate BA or Delayed BA type.

Figure 11:
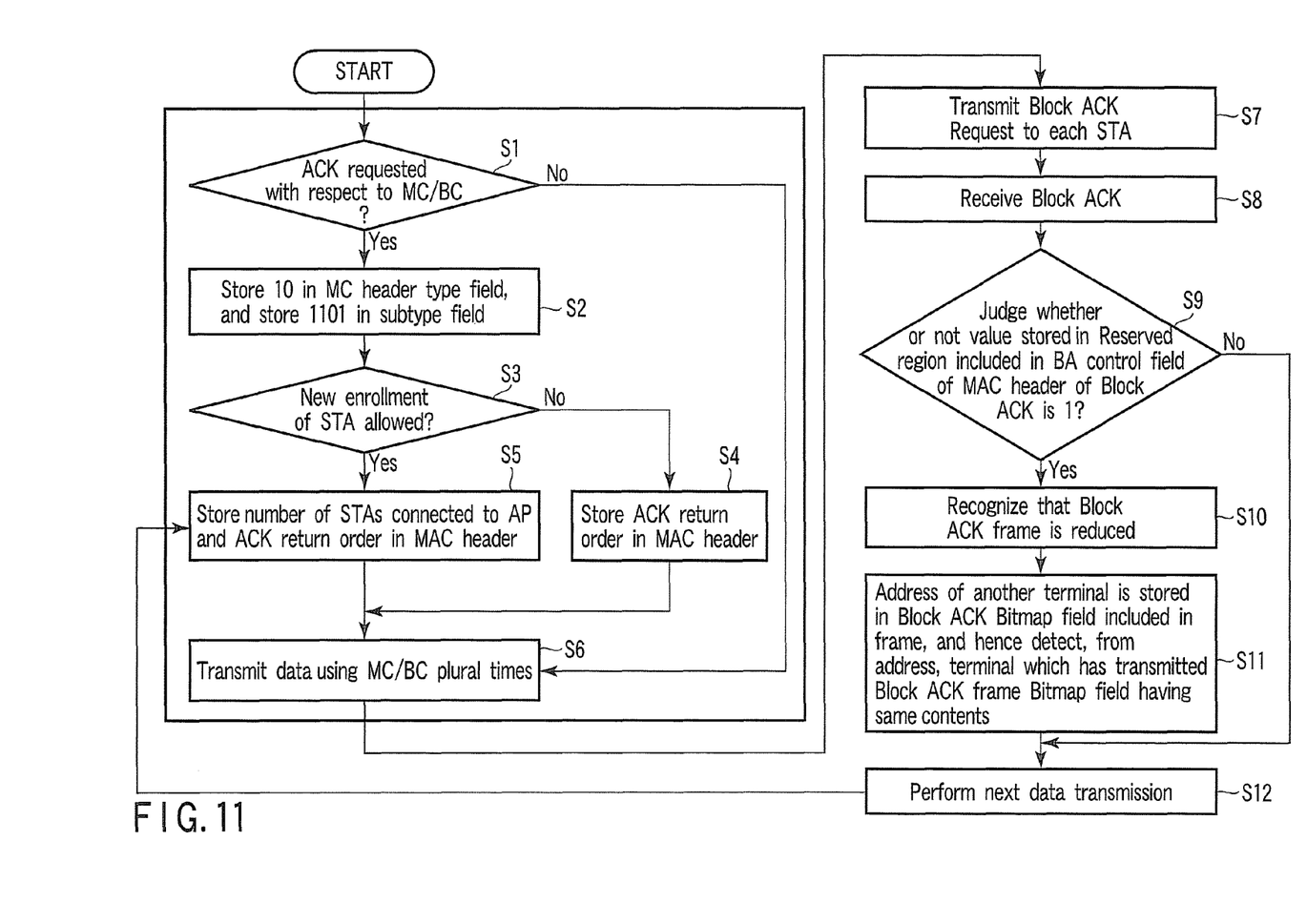
FIG. 11 is a flow chart showing an operation example on an access point side in the first embodiment.

FIG. 11 is a flow chart showing an operation example on an access point AP in the first embodiment. First, it is judged whether or not the Block ACK be requested with respect to MC or BC communication to be performed (step S1). In a case where it is judged that the Block ACK be requested (Yes), as an identifier indicating that the Block ACK be requested, predetermined data are stored in a type field or a subtype field of a frame control section of the MAC header (step S2). Afterward, it is judged whether or not the new enrollment of the wireless terminal STA is allowed (step S3). In a case where it is judged that the new enrollment of the wireless terminal STA is not allowed (No), the Block ACK return order is stored in the MAC header (step S4). On the other hand, in a case where it is judged in the step S3 that the new enrollment is allowed (Yes), the number of the wireless terminals STA presently connected to the access point AP and the Block ACK return order are stored in the MAC header (step S5).

After the step S4 or S5, the data is transmitted using the MC or BC communication (step S6). It is to be noted that even in a case where it is judged in the step S1 that the Block ACK is not requested (No), the processing shifts to step S6 to transmit the data.

Subsequently, a Block ACK Request frame for requesting the Block ACK is transmitted to each wireless terminal STA (step S7). Then, the Block ACK frame with respect to a Block ACK Request is received (step S8).

Subsequently, it is judged whether or not the data stored in the Reserved region included in the BA Control field of the MAC header returned from the wireless terminal STA is 1 (step S9). In a case where it is judged that 1 is stored in the Reserved region (Yes), it is recognized that the byte length of the Block ACK frame is reduced (step S10). In this case, the MAC address of another wireless terminal is stored in the Block ACK Bitmap field included in the Block ACK frame. Therefore, the wireless terminal which has transmitted the Block ACK Bitmap field of the Block ACK frame having the same contents is detected based on the MAC address (step S11).

Then, the next data is transmitted (step S12). Afterward, the processing returns to the step S5. It is to be noted that even in a case where it is judged in the step S9 that 1 is not stored in the Reserved region (No), the processing shifts to step S12.

Figure 12:
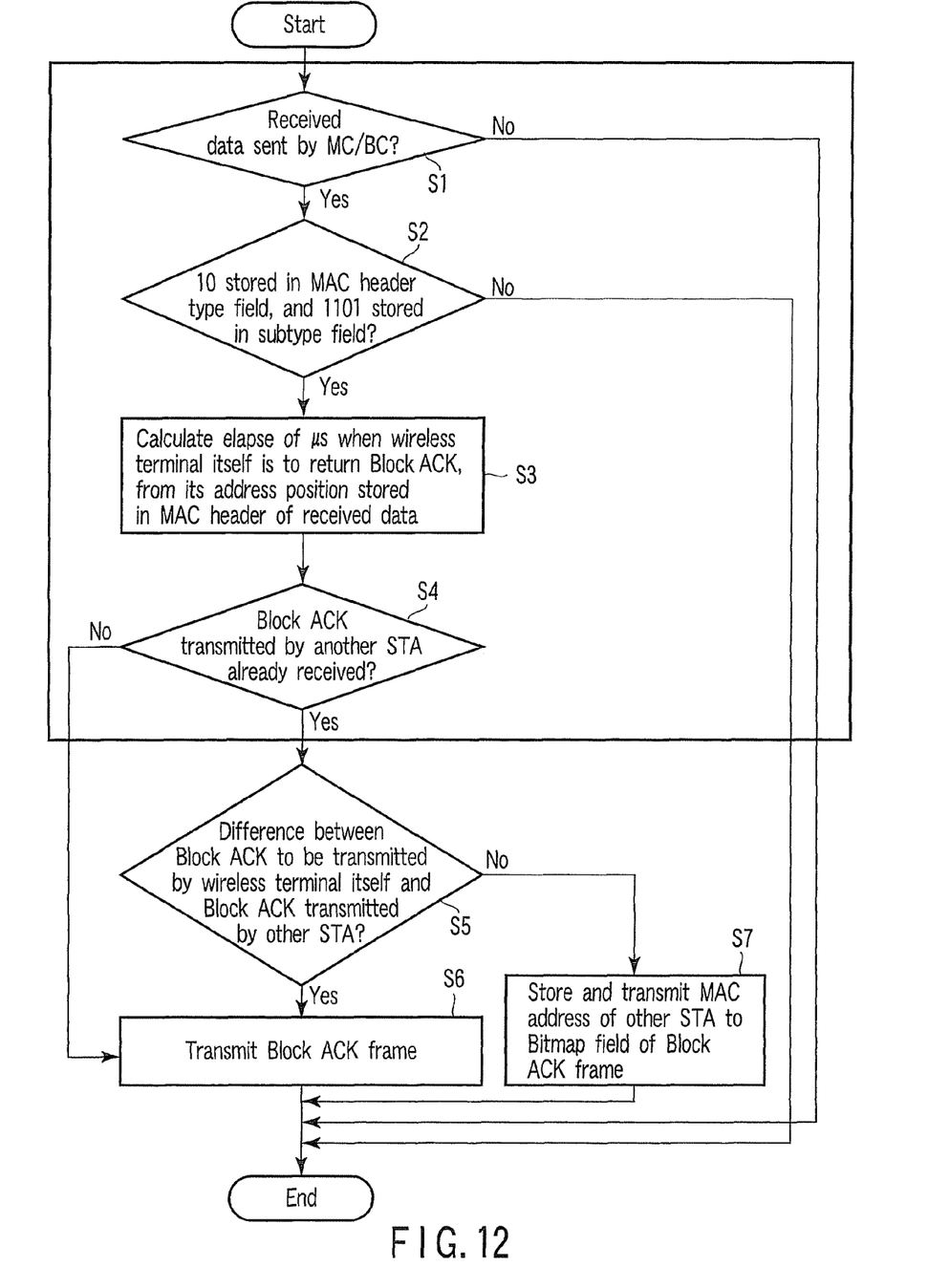
FIG. 12 is a flow chart showing an operation example on a wireless terminal side in the first embodiment.

FIG. 12 is a flow chart showing an operation example on a wireless terminal STA in the first embodiment. When the transmitted data frame is received, it is judged whether or not the data frame is a data frame transmitted by the MC or BC communication (step S1). In a case where it is judged that the data frame has been transmitted by the MC or BC communication (Yes), it is judged whether or not 10 is stored in the type field of the MAC header and 1101 is stored in the subtype field (step S2). In a case where it is judged that the above data is stored (Yes), the elapse of the time in terms of μs when the wireless terminal itself is to return the Block ACK is calculated from the address position of the wireless terminal itself stored in the MAC header of the received data (step S3). Afterward, it is judged whether or not the Block ACK transmitted by the other wireless terminal has been received (step S4).

In a case where it is judged in the step S4 that the Block ACK has been received (Yes), the Block ACK frame to be returned by the wireless terminal itself is compared with the Block ACK frame sent from the other wireless terminal to judge whether or not there is a difference between the frames (step S5). In a case where it is judged that there is a difference between both the frames (Yes), at scheduled time, the Block ACK frame is transmitted (step S6).

On the other hand, in a case where it is judged in the step S4 that the Block ACK frame transmitted by the other wireless terminal has not been received (No), the processing shifts to the step S6. Moreover, in a case where it is judged in the step S5 that there is not any difference between the frames (No), the byte length of the Block ACK frame is shortened, and the MAC address of the other wireless terminal is stored in the Block ACK Bitmap field of the Block ACK frame. Afterward, the Block ACK frame is transmitted (step S7).

The processing ends after the above step S6 or S7. It is to be noted that even in a case where it is judged in the step S1 that the data frame is not the data frame transmitted by the MC or BC communication (No), the processing ends. Moreover, even in a case where it is judged in the step S2 that the predetermined data is not stored (No), the processing ends.

It is to be noted that each wireless terminal has the same meaning of the Block ACK frame to be returned as the acknowledgment by the wireless terminal with respect to the data frame transmitted by the MC or BC communication in the operation example of the wireless terminal shown in the flow chart of FIG. 12 described above. The wireless terminal has a function of storing, in the Block ACK frame, the reception situation with respect to the data frame transmitted from the access point AP, and returning the frame by use of the MC or BC communication. In the present embodiment, the Block ACK frame returned by the wireless terminal STA1 is notified to the access point AP and the other wireless terminals STA2, STA3 by use of the MC or BC communication. The other wireless terminals STA2, STA3 do not return, to the access point AP, the reception situations of the data frames in the wireless terminals themselves, and one of the wireless terminals representatively returns the frame.

Each wireless terminal compares the Block ACK Bitmap field of the Block ACK frame returned from the wireless terminals other than the wireless terminal itself with the Block ACK Bitmap field of the Block ACK frame to be returned by the wireless terminal itself. In a case where all the fields match with one another, the MAC address is set to the Block ACK Bitmap field. Therefore, the byte length of the Block ACK Bitmap field is reduced.

That is, according to the original standard, the Block ACK frame has a size of a 152 byte length. However, in the present embodiment, in a case where the Block ACK Bitmap fields match with each other as a comparison result, the length can be reduced to 30 bytes. Therefore, under a wireless LAN environment with a communication speed of, for example, 54 Mbps, the data frame transmitted from the access point at intervals of 38.5×n (n is the number of the wireless terminals in the BBS) μs can be transmitted at intervals of 20×n μs. A specific example will be described. When eight wireless terminals participate in the MC communication, the data frame transmitted from the access point at intervals of 38.5×8=308 μs by a conventional system can be transmitted at intervals of about half, that is, 20×8=160 μs by the system of the present embodiment.

According to the first embodiment, the access point notifies the participants of the start and end of the MC or BC communication, and each wireless terminal returns the Block ACK as the acknowledgment of the MC or BC communication to the access point. In consequence, the throughput of the data communication in the MC or BC communication improves, and a wireless band can effectively be used in the BBS.

Second Embodiment

The second embodiment is different from the first embodiment in the following respects. That is, each wireless terminal compares a Block ACK Bitmap field included in a Block ACK frame transmitted from another wireless terminal with a Block ACK Bitmap field included in a Block ACK frame to be transmitted by the wireless terminal itself. As the result of this comparison, when the Block ACK Bitmap fields partially or entirely match with each other, the beforehand prepared Block ACK frame is corrected as follows. That is, 2 (10) is stored in a Reserved region of a BA Control field. Furthermore, the byte amount of data common to the Block ACK Bitmap fields is stored as numeric data in the top byte of the Block ACK Bitmap field of the Block ACK frame, and the original Block ACK Bitmap of a mismatch portion is stored after the top byte.

Figure 13:
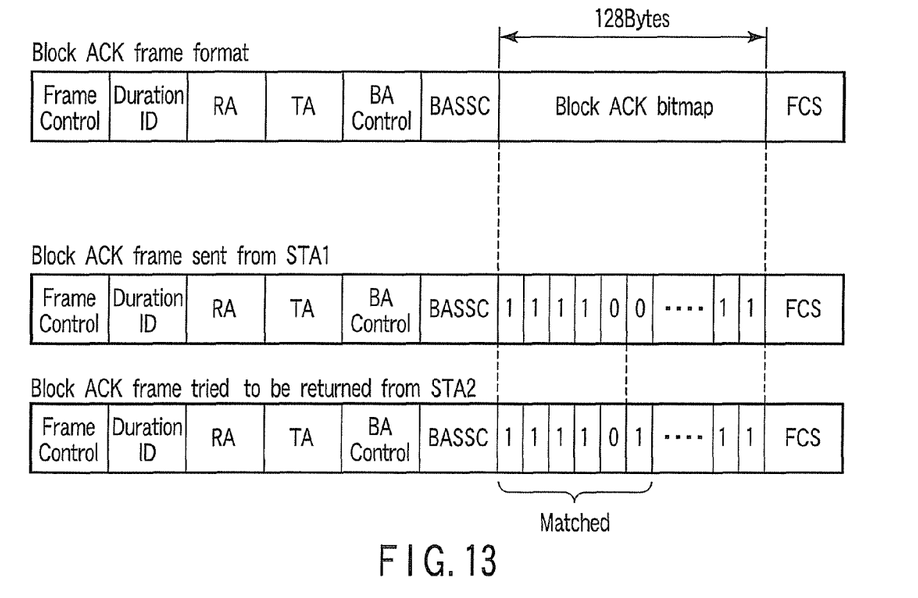
FIG. 13 is a diagram showing a behavior in a case where according to a second embodiment, in a wireless terminal STA2 which has received Block ACK sent from a wireless terminal STA1, the Block ACK Bitmap field of the sent Block ACK frame is compared with the Block ACK Bitmap field of the Block ACK frame to be returned from the wireless terminal STA2, and both the fields partially match with each other.

FIG. 13 shows a behavior in a case where in FIG. 5B described above, the Block ACK Bitmap field of the Block ACK frame transmitted from a wireless terminal STA1 and received by a wireless terminal STA2 matches with the Block ACK Bitmap field of the Block ACK frame which has been generated by the wireless terminal STA2 and which is to be returned, in five bytes from the top.

Figure 14:
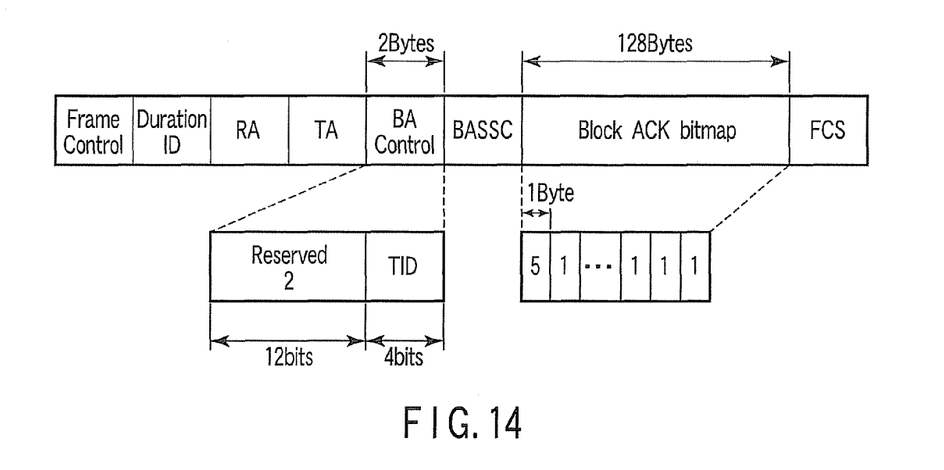
FIG. 14 is a diagram showing a behavior in a case where when the fields partially match with each other as a comparison result shown in FIG. 13, the Block ACK frame is corrected in the wireless terminal STA2.

In this case, as shown in FIG. 14, in the wireless terminal STA2, 2 is stored in the Reserved region of the BA Control field, and 5 is stored as the matching byte numeric data in the top byte of the Block ACK Bitmap field. Moreover, after the second byte from the top of the Block ACK Bitmap field, the original Block ACK Bitmap of the mismatch portion is stored. Afterward, as shown in FIG. 5C, the Block ACK frame corrected in this manner is returned to the access point AP and the wireless terminals other than the wireless terminal itself by use of MC or BC communication.

In the present embodiment, the Block ACK Bitmap field of the Block ACK frame returned from the wireless terminal STA2 is reduced from the original standard 127 bytes to 124 bytes. That is, the Block ACK frame has a size of 152 bytes in the original standard, but is reduced to 148 bytes according to the present embodiment.

It is to be noted that in the present embodiment, the Block ACK Bitmap field of the Block ACK frame to be returned by the wireless terminal STA2 does not have the original meaning that the reception situation of the data frame of the wireless terminal itself is indicated. The Block ACK Bitmap field indicates the number of the bytes matching with that of the Block ACK Bitmap field returned from the other wireless terminal. The receiver of the Block ACK frame needs to be notified of the change of the meaning, so that 2 is stored in the Reserved region of the BA Control field as shown in FIG. 14. It is notified that the meaning of the Block ACK Bitmap field has changed.

According to the second embodiment, as a result of the comparison of the Block ACK Bitmap fields, data indicating the number of the matching bytes from the top of the data stored in the Block ACK Bitmap field is stored in a first byte as the top. As a result, the Block ACK frame has a size of 152 bytes in the original standard, but can be reduced to 25 bytes at maximum.

A flow chart showing the operation example of the access point in the second embodiment is basically similar to that of FIG. 11 described above. However, the present embodiment is different only in that it is judged in step S9 whether or not the data stored in the Reserved region included in the BA Control field of the MAC header returned from the other wireless terminal is 2. Moreover, a flow chart showing the operation example of the wireless terminal is basically similar to that of FIG. 12 described above. However, the present embodiment is different only in that in step S7, matching byte numeric data is stored in the top of the Block ACK Bitmap field, and the original Block ACK Bitmap of the mismatch portion is stored in the second byte after the top of the Block ACK Bitmap field.

Figure 15:
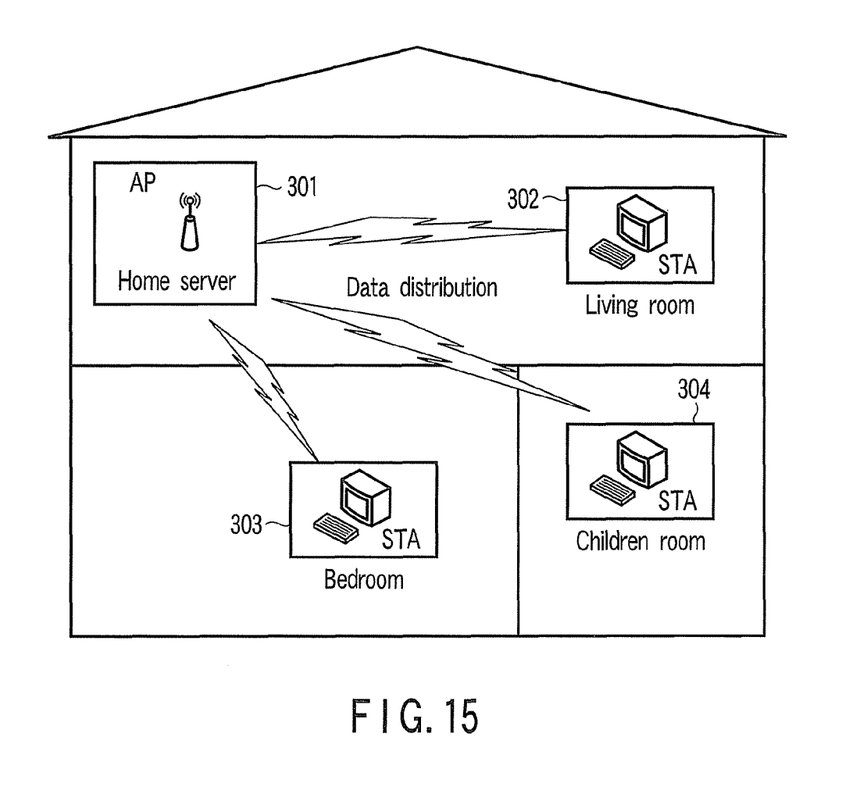
FIG. 15 is a block diagram showing a wireless communication system according to an application example of the present invention.

FIG. 15 shows the constitution of an application example according to the present invention. The present example relates to a wireless communication system in which image data and voice data are stored in a home server 301 installed in a general household, and the home server 301 simultaneously distributes, to three displays 302 to 304, the image data and voice data by the MC or BC communication of the wireless LAN communication. The home server 301 is installed in, for example, a living room, and has a function similar to that of the access point in the first and second embodiments. Each of the three displays 302 to 304 has a function similar to that of the wireless terminal. The display 302 can be installed in, for example, the living room, the other display 303 can be installed in, for example, a bed room, and the remaining display 304 can be installed in, for example, a children room. Here, the home server 301 simultaneously distributes the data to the three displays 302 to 304 by the MC or BC communication, and the three displays return Block ACK by the MC or BC communication.

In the wireless communication system having such a constitution, in a case where frame loss is generated when the home server 301 distributes the data to the three displays 302 to 304, the size of the Block ACK frame returned from any of the displays is reduced from the original standard 152 bytes. In consequence, a BBS wireless band where the wireless communication system is installed can effectively be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication system which performs wireless communication between one access point and a plurality of wireless terminals;

wherein the access point is configured to transmit a plurality of data frames to the plurality of wireless terminals by one communication of multicast communication and broadcast communication, and configured to request Block ACK frames as affirmative acknowledgment;

each of the plurality of wireless terminals is configured to generate the Block ACK frame and configured to return the Block ACK frame to the access point and the wireless terminals other than the wireless terminal itself by one communication of the multicast communication and the broadcast communication, in a case where the access point requests the Block ACK frame;

wherein each of the plurality of wireless terminals is configured to compare a Block ACK Bitmap field included in the Block ACK frame transmitted from the wireless terminals other than the wireless terminal itself with a Block ACK Bitmap field included in a Block ACK frame generated by the wireless terminal itself;

configured to reduce the size of the Block ACK Bitmap field of the Block ACK frame generated by the wireless terminal itself in a case where both the fields match with each other; and configured to store, in the reduced Block ACK Bitmap field, data to identify a transmitter wireless terminal in which the Block ACK Bitmap field matches.

2. A wireless communication system which performs wireless communication between one access point and a plurality of wireless terminals;

wherein the access point is configured to transmit a plurality of data frames to the plurality of wireless terminals by one communication of multicast communication and broadcast communication, and configured to request Block ACK frames as affirmative acknowledgment;

each of the plurality of wireless terminals is configured to generate the Block ACK frame and configured to return the Block ACK frame to the access point and the wireless terminals other than the wireless terminal itself by one communication of the multicast communication and the broadcast communication, in a case where the access point requests the Block ACK frame;

wherein each of the plurality of wireless terminals is configured to compare a Block ACK Bitmap field included in the Block ACK frame transmitted from the wireless terminals other than the wireless terminal itself with a Block ACK Bitmap field included in a Block ACK frame generated by the wireless terminal itself;

configured to reduce the size of the Block ACK Bitmap field of the Block ACK frame generated by the wireless terminal itself in a case where both the fields match with each other; and configured to store, in the reduced Block ACK Bitmap field, data to identify a transmitter wireless terminal in which the Block ACK Bitmap field matches, and wherein the data to identify the transmitter wireless terminal is an Medium Access Control (MAC) address.

3. A wireless communication system which performs wireless communication between one access point and a plurality of wireless terminals;

wherein the access point is configured to transmit a plurality of data frames to the plurality of wireless terminals by one communication of multicast communication and broadcast communication, and configured to request Block ACK frames as affirmative acknowledgment;

each of the plurality of wireless terminals is configured to generate the Block ACK frame and configured to return the Block ACK frame to the access point and the wireless terminals other than the wireless terminal itself by one communication of the multicast communication and the broadcast communication, in a case where the access point requests the Block ACK frame;

wherein each of the plurality of wireless terminals is configured to compare a Block ACK Bitmap field included in the Block ACK frame returned from the wireless terminals other than the wireless terminal itself with a Block ACK Bitmap field included in a Block ACK frame generated by the wireless terminal itself and to store, in the Block ACK Bitmap field of the Block ACK frame, the data amount of a portion common to that of the Block ACK Bitmap field returned from the other wireless terminal in a case where the fields partially or entirely match with each other.

4. Wireless terminals for use in a wireless communication system which performs wireless communication between one access point and the plurality of wireless terminals:

each of the wireless terminals being configured to receive a data frame transmitted from the access point;

configured to judge whether or not the received data frame has been transmitted by one communication of multicast communication and broadcast communication;

configured to further judge whether or not the return of a Block ACK frame as affirmative acknowledgment with respect to received contents is necessary, in a case where it is judged that the data frame has been transmitted by one communication of the multicast communication and the broadcast communication;

configured to generate the Block ACK frame in a case where it is judged that the return of the Block ACK frame is necessary;

configured to return the Block ACK frame to the access point and the wireless terminals other than the wireless terminal itself by one communication of the multicast communication and the broadcast communication;

each of the wireless terminals being configured to compare a Block ACK Bitmap field included in the Block ACK frame returned from the wireless terminals other than the wireless terminal itself with a Block ACK Bitmap field included in the Block ACK frame generated by the wireless terminal itself; and configured to return a Block ACK frame having different contents in accordance with the comparison result to the access point and the wireless terminals other than the wireless terminal itself.

5. Wireless terminals for use in a wireless communication system which performs wireless communication between one access point and the plurality of wireless terminals:

each of the wireless terminals being configured to receive a data frame transmitted from the access point;

configured to judge whether or not the received data frame has been transmitted by one communication of multicast communication and broadcast communication;

configured to further judge whether or not the return of a Block ACK frame as affirmative acknowledgment with respect to received contents is necessary, in a case where it is judged that the data frame has been transmitted by one communication of the multicast communication and the broadcast communication;

configured to generate the Block ACK frame in a case where it is judged that the return of the Block ACK frame is necessary;

configured to return the Block ACK frame to the access point and the wireless terminals other than the wireless terminal itself by one communication of the multicast communication and the broadcast communication;

each of the wireless terminals being configured to compare a Block ACK Bitmap field included in the Block ACK frame returned from the wireless terminals other than the wireless terminal itself with a Block ACK Bitmap field included in a Block ACK frame generated by the wireless terminal itself;

configured to reduce the size of the Block ACK Bitmap field of the Block ACK frame generated by the wireless terminal itself in a case where both the fields match with each other; and configured to store, in the reduced Block ACK Bitmap field, data to identify a transmitter wireless terminal in which the Block ACK Bitmap field matches.

6. Wireless terminals for use in a wireless communication system which performs wireless communication between one access point and the plurality of wireless terminals:

each of the wireless terminals being configured to receive a data frame transmitted from the access point;

configured to judge whether or not the received data frame has been transmitted by one communication of multicast communication and broadcast communication;

configured to further judge whether or not the return of a Block ACK frame as affirmative acknowledgment with respect to received contents is necessary, in a case where it is judged that the data frame has been transmitted by one communication of the multicast communication and the broadcast communication;

configured to generate the Block ACK frame in a case where it is judged that the return of the Block ACK frame is necessary;

configured to return the Block ACK frame to the access point and the wireless terminals other than the wireless terminal itself by one communication of the multicast communication and the broadcast communication;

each of the wireless terminals being configured to compare a Block ACK Bitmap field included in the Block ACK frame returned from the wireless terminals other than the wireless terminal itself with a Block ACK Bitmap field included in a Block ACK frame generated by the wireless terminal itself; and configured to store, in the Block ACK Bitmap field of the Block ACK frame, the data amount of a portion common to that of the Block ACK Bitmap field returned from the wireless terminals other than the wireless terminal itself in a case where the fields partially or entirely match with each other.

* * * * *